United States Patent Office 3,017,402
Patented Jan. 16, 1962

3,017,402
POLYMERIZATION OF ETHYLENE WITH MOLYBDENUMOXIDE ON SILICA-ALUMINA CATALYST
Willem F. Engel, Amsterdam, Netherlands, assignor to Shell Oil Company, a corporation of Delaware
No Drawing. Filed May 28, 1958, Ser. No. 738,278
Claims priority, application Great Britain May 31, 1957
2 Claims. (Cl. 260—94.9)

This invention relates to novel polymerization catalyst. More particularly it relates to novel catalysts for the polymerization of ethylene to produce polyethylene.

It has been reported that ethylene may be polymerized with catalysts of certain oxides which are supported on alumina as a carrier. When such catalysts are employed for the polymerization of ethylene the reaction velocity of the ethylene polymerization is lower than is suitable for commercial operations. Thus, in order to improve the polymerization processes various techniques have been employed which are intended to obviate the disadvantages inherent in the catalyst system. Such techniques include, for example, reducing the catalyst composition with hydrogen in which event liquid polymers are normally obtained. Alternatively, the reduction is accomplished with other reducing agents such as metal alkyls, metal hydrides, alkali metals, alkali earth metals, and the like. Such chemical reducing agents are characterized by high cost which is a substantial disadvantage. Further, some of these reducing agents, as aluminum alkyls, are flammable and difficult to handle. The present invention obviates the disadvantages described above in addition to providing advantages not realized by prior art processes for the polymerization of ethylene.

It is an object of this invention to provide novel polymerization catalysts for the polymerization of ethylene. It is another object of this invention to provide polymerization catalysts which exhibit improved reaction velocities for the polymerization of ethylene. It is yet another object in this invention to provide low cost polymerization catalysts which are easy to prepare and have improved polymerizing capacity. Other objects will become apparent as the description of the invention proceeds.

These and other objects are accomplished by a composition comprising a molybdenum oxide supported on an alumina-silica carrier the molybdenum having a valence of less than 6. When such catalysts are employed for the polymerization of ethylene, as will hereinafter be described, it will be found that high yields of normally solid polyethylene is obtained at high velocities. Further, the present catalysts may be suitably reduced with hydrogen to produce compositions which will polymerize ethylene to normally solid polymers.

It will be found that the present compositions are active over a wide range of proportions but it will be also found that the relative proportions of the components have a considerable influence on the polymerization. Thus, in the preferred embodiments the proportion of the alumina, in relation to the silica on a total weight basis, is between 5 and 65% and particularly preferred when it is present in amounts in the order of about 25%. On the other hand, it will be found that a ratio between 80:20 and 1:90, by weight, is also useful but the extremes within this range is less preferred. The molybdenum, calculated as the free metal on the catalyst as a whole, ranges from about 0.1 to about 10%, by weight, but it is more preferred that the molybdenum be present in amounts ranging from 0.5 to about 4% by weight.

It is an advantage of the present invention that the processes for preparing the novel catalysts are capable of preparation by a variety of routes. One method of preparation comprises mixing oxides of aluminum and silicon which are in a gel form. The mixed gel can be obtained by coprecipitation from solutions of soluble compounds of aluminum and silicon. Mixed gels can also be prepared by precipitating a gel of one oxide on a previously made gel on the other oxide. Other initial materials may be used in the preparation of catalyst for the present invention including chemical compounds derived from these oxides such as various aluminum silicates or clay which have been treated with a mineral acid. Alternatively, a convenient starting material is afforded as commercial cracking catalysts comprising the oxides of aluminum and silicon but if desired the relative proportion may be altered or adjusted by impregnating the cracking catalyst with a solution of a compound yielding aluminum oxide, as aluminum nitrate, on heating.

The starting material for the novel catalyst, which comprises the oxides of aluminum and silicon, is impregnated with a solution of a molybdenum compound which yields an oxygen-containing molybdenum compound on heating. Preferably an aqueous solution of ammonium molybdate is used. Before impregnating the starting material containing the oxides of aluminum and silicon, it is advantageous in many cases to treat the starting material for several hours with air or other oxygen-containing gas, preferably together with water vapor, at temperatures in the order of 500 to 750° C. Instead of an oxygen-containing gas an inert gas may be used in most cases.

The catalyst mass, after impregnating and drying, is heated for several hours at a temperature above 300° C., with 500° C. being better, in dry air or in a dry inert gas. Usually the catalyst is further conditioned by treating it with a reducing gas, such as hydrogen, carbon monoxide or a hydrocarbon at temperatures ranging from 300° C. to about 650° C. This heating effects reduction of the molybdenum compound to a lower valency. The best conditioning temperatures are usually between 400 and 550° C. In this regard, it may be mentioned that the catalyst may contain molybdenum in several valency states which are lower than six. The pressure of the reducing gas may range from about normal pressure up to 300 atmospheres or more, but for practical purposes it will usually be between 5 and 50 atmospheres. The time required for the conditioning step will vary and is dependent upon several factors such as the temperature at which it is carried out, the pressure and the nature of the reducing gas, the particle size of the catalyst and its molybdenum content. Consequently the time required for the conditioning may vary within wide limits ranging from a few minutes to several hours.

Various other techniques may be applied in the preparation of the catalyst. Thus instead of impregnating a mixed gel of aluminum oxide and silicon oxide with an oxygen-containing molybdenum compound, a mixed gel may be prepared by coprecipitation of all the three oxides constituting the catalyst from a solution containing soluble compounds of the three constituent elements. The catalyst can be used in various forms. It is best however that the catalysts be in powdered form having particle sizes ranging between 10 and 200 microns. The catalyst thus prepared is useful for the preparation of polyethylene.

The ethylene feedstock may contain inert hydrocarbons, as is usually found in refinery gas streams such as methane, ethane, propane, and the like and even a few percent of propylene which contributes to the production of resinous high molecular weight products. With the novel catalysts ethylene can be polymerized in the gas phase and in the absence of a liquid reaction medium. Upon completion of the polymerization the catalyst may be treated for the recovery of the solid polymerization products by, for example, extraction with suitable solvents. However, increased rates of ethylene conversion and simplified continuous operations are accomplished in the presence of suitable liquid reaction media. The liquid reaction medium may also be employed as a means of contacting the ethylene with catalyst by employing the technique of preparing a solution of ethylene in the liquid reaction medium and contacting the resultant solution with the polymerization catalyst. Usually it is preferred to employ inert liquid organic materials such as hydrocarbons, particularly aliphatic hydrocarbons such as pentane, hexane, heptane, isooctane and decane and cyclo-aliphatic hydrocarbons such as cyclohexane. Also in some cases aromatics such as benzene, toluene, the xylenes and other alkylated aromatics may be used.

The liquid reaction medium appears to perform a variety of functions depending upon the operating conditions, nature of the catalyst and identity of the medium. For example, the liquid reaction medium appears to function as a solvent for the ethylene to bring it into contact with the catalyst surface and/or growing ethylene polymer chain. The liquid reaction medium may function to protect the growing polymer chain from chain breakers, such as reaction-inhibiting impurities in the feed stock or polymer formed upon certain parts of the catalyst surface. The liquid reaction medium serves to reduce the viscosity of the solid polymer retained upon and within the catalyst and thus may facilitate the process of transferring ethylene where it is needed and dissolves some of the normally solid product from the catalyst surface. The liquid reaction medium makes possible a solid-liquid interface in which the growing ethylene polymer chain may be oriented and from which it may react with ethylene supplied from solution in the medium and/or from the gas phase.

When polymerization of ethylene is effected from the gaseous phase and in the absence of a liquid hydrocarbon reaction medium, the catalyst may be employed in the form of fluidized particles or a fluidized fixed bed of particles, as a fixed bed, or countercurrent moving bed of particles. Catalyst coated with solid polymer produced in such vapor phase processes can be treated to recover solid polymerization products and to cleanse the catalyst, employing as solvents liquid hydrocarbons which may be the same as the liquid hydrocarbon reaction media above described or chemically inert chlorinated hydrocarbon solvents or other solvents. In such cases a hot solvent preferably is used.

A fixed bed reactor with either downflow or upflow of ethylene and liquid hydrocarbon reaction medium can be employed. Parallel fixed bed reactors can be employed to obtain continuous operations, as in fixed bed hydrocarbon catalytic cracking units, one bed being freed from polymer and/or reconditioned while the other bed is on stream. A moving bed or slurry operation can be employed, in which a slurry of catalyst in the liquid hydrocarbon reaction medium is allowed to flow downwardly through a tower or through one or more tubes. Ethylene or a solution of ethylene in liquid hydrocarbon reaction medium is injected into the lower portion of the tower or tubes and optionally at various elevations within the tower or tubes. A slurry of catalyst and solid polymerization products is withdrawn as one stream from the reactor and unconverted ethylene and/or diluent gases are withdrawn from the reactor as a second stream. In the moving bed operation, the solid ethylene polymers are separated from the catalyst in a zone external to the reaction zone.

Other types of reactors may also be employed. Thus, the polymerization can be carried out batchwise in autoclaves preferably equipped with stirring equipment. Stirred autoclaves can be employed also for continuous operations. In another method of operation, catalyst, ethylene and liquid hydrocarbon reaction medium can be passed concurrently through a reaction tube or coil, thence to a separator.

The conditioning treatment hereinabove described is required not only for fresh catalyst, but is also required for catalyst which has become relatively inactive in the polymerization step. After the polymer has been removed from the catalyst particles the catalyst may be reconditioned before it is again employed for effecting polymerization. The conditions during this reconditioning can often be milder than during the first conditioning of the catalyst. Thus temperatures lower than 300° C. and even lower than 100° C. may be applied. When catalyst can no longer be rendered sufficiently active by simple removal of polymer and conditioning with a reducing gas as hereinabove described it may be regenerated by burning combustible deposits therefrom with oxygen followed by the said conditioning step.

The contact time or space velocity employed in the polymerization process will be selected with reference to the other process variables, catalysts, the specific type of product desired and the extent of ethylene conversion desired in any given run or pass over the catalyst.

The temperature at which ethylene polymerization, in accordance with the present invention, is effected may be between 50 and 350° C., but it is preferably between 50 and 200° C. The pressure may be varied between atmospheric pressure and 500 atmospheres, though in general suitable pressures are between 15 and 100 atmospheres.

The present invention may be illustrated by the following examples, wherein Example I describes the catalyst preparation.

Example I

Fifty grams of a commercial cracking catalyst in the form of microspheroidal particles of a gel consisting of aluminum oxide and silicon dioxide in a proportion of 12 to 88 parts by weight, the particle size of the gel ranging from 20 to 120 microns, was heated for 10 hours at 650° C. in a current of air containing 5% by volume of water vapor. The mixture of air and water vapor was passed through the catalyst at a velocity of 30 litres per hour. Subsequently the mixture of oxides was cooled to room temperature by passing a current of dry air through it. After this treatment the material appeared to have a surface of 500 square meters per gram and was suitable for use as a carrier for the oxygen-containing molybdenum compound.

Twelve milliliters of an aqueous solution of ammonium molybdate was added with stirring to 10 grams of the above carrier at 20° C. The amount of solution employed was that which just could be absorbed by the carrier without leaving an unabsorbed liquid phase. The procedure was repeated twice with 10 gram portions of the carrier, the concentration of ammonium molybdate in the solutions used in the three successive preparations being so adjusted that the molybdenum concentration in the respective batches of catalyst (calculated as molybdenum metal on the dry carrier) amounted to 2.5, 4.6 and 7.5% by weight. After impregnation the carrier was air-dried at 120° C. for 2 hours and subsequently heated in a glass tube in a current of 30 liters per hour of carefully dried air for 5 hours at 500° C. Pure nitrogen was then passed through the tube to flush out the air and to cool the catalyst. Thereafter 1.5 grams of the material was transferred to a smaller tube for partial reduction of the molybdenum compound. To this end the small tube was heated to 500° C. and a current of 5 liters per hour of hydrogen at atmospheric pressure was passed through it for two hours. After this treatment the catalyst was ready for use and the glass tube containing it was sealed so as to avoid any contact with moisture.

In a similar way another portion of catalyst was prepared consisting of aluminum oxide and silicon dioxide in the relative proportion of 25:75 parts by weight and 2.5% by weight of molybdenum (calculated as metal), the preparation being the same as described above except that 15 milliliters of ammonium molybdate solution was used for impregnating the carrier. The surface area of the dry carrier in this case was 425 square meters per gram.

For comparison only a third catalyst was prepared in a similar way using aluminum oxide with a surface area of 280 square meters per gram as the carrier.

*Example II*

The polymerization of ethylene was carried out in an autoclave with a volume of 300 milliliters. A sealed tube containing 1.5 grams of the catalyst was placed in the dried autoclave which was then closed and freed from oxygen and water vapor by evacuation and flushing with pure dry nitrogen. The sealed tube was broken by agitating the autoclave and 100 milliliters of pure isooctane was then introduced into the autoclave.

Continuing the agitation, the autoclave was heated to 130° C. whereupon dry ethylene was introduced, the pressure being raised in the course of 1 hour to 32 atmospheres. Agitation was continued at 130° C. for a further two hours during which time the pressure in the autoclave was maintained at about 32 atmospheres by the continued introduction of ethylene after which the autoclave was cooled and opened. The results are summarized in the following table.

| Carrier | $Al_2O_3:SiO_2$ By weight | Mo, percent w. as metal on dry carrier | Grams Solid Polymer per gm. catalyst | Grams solid Polymer / gm. Mo |
|---|---|---|---|---|
| $Al_2O_3$—$SiO_2$ | 12:88 | 2.5 | 4 | |
| $Al_2O_3$—$SiO_2$ | 25:75 | 1.0 | 11.4 | 1,140 |
| $Al_2O_3$—$SiO_2$ | 25:75 | 2.5 | 18 | 720 |
| $Al_2O_3$—$SiO_2$ | 25:75 | 4.6 | 15 | 326 |
| $Al_2O_3$—$SiO_2$ | 25:75 | 7.5 | 15 | 200 |
| $Al_2O_3$ | | 2.5 | 1.5 | |

From the foregoing it will be seen that improved yields result using the catalysts of this invention. It will be appreciated that this invention is capable of numerous modification in techniques for the catalyst preparation and for the polymerization. Such modifications however are within the scope of the present invention.

I claim:
1. The process which comprises polymerizing ethylene at a temperature between about 50° C. and about 350° C. and pressures ranging from about normal pressure to about 500 atmospheres in the presence of a catalyst composition consisting essentially of from 35 to 95% of silica, from 5 to 65% of alumina, and from 0.1 to 10% of molybdenum oxide, said molybdenum oxide having been treated with hydrogen at a temperature of between 400 and 550° C. and a pressure between 5 and 50 atmospheres for a time sufficient to reduce the molybdenum to a valence of less than 6.
2. The process of claim 1, in which the alumina and silica is in a weight ratio of 25:75, respectively.

References Cited in the file of this patent
UNITED STATES PATENTS

| | | |
|---|---|---|
| 2,692,259 | Peters | Oct. 19, 1954 |
| 2,726,234 | Field et al. | Dec. 6, 1955 |
| 2,731,453 | Field et al. | Jan. 17, 1956 |
| 2,773,841 | Kimberlin et al. | Dec. 11, 1956 |
| 2,776,247 | Anhorn et al. | Jan. 1, 1957 |
| 2,780,617 | Zletz | Feb. 5, 1957 |
| 2,783,211 | McKinley | Feb. 26, 1957 |
| 2,791,576 | Field et al. | May 7, 1957 |
| 2,794,005 | Lefrancois | May 28, 1957 |
| 2,824,089 | Peters et al. | Feb. 18, 1958 |
| 2,825,721 | Hogan et al. | Mar. 4, 1958 |
| 2,849,383 | Hirschler et al. | Aug. 26, 1958 |
| 2,862,874 | Boedeker et al. | Dec. 2, 1958 |
| 2,921,024 | Folkins et al | Jan. 12, 1960 |